US010006795B2

(12) United States Patent
Sisk et al.

(10) Patent No.: US 10,006,795 B2
(45) Date of Patent: Jun. 26, 2018

(54) MEASURING VESSEL

(71) Applicant: PUMPWATCH LIMITED, County Kildare (IE)

(72) Inventors: Henry Benjamin Sisk, County Dublin (IE); Siobhan Keogh, County Kildare (IE); Silvano Burella, County Kildare (IE)

(73) Assignee: PUMPWATCH LIMITED, Clane (IE)

( * ) Notice: Subject to any disclaimer, the term of this patent is extended or adjusted under 35 U.S.C. 154(b) by 0 days. days.

(21) Appl. No.: 15/024,246

(22) PCT Filed: Sep. 24, 2014

(86) PCT No.: PCT/IE2014/000016
§ 371 (c)(1),
(2) Date: Mar. 23, 2016

(87) PCT Pub. No.: WO2015/044935
PCT Pub. Date: Apr. 2, 2015

(65) Prior Publication Data
US 2016/0370217 A1 Dec. 22, 2016

(30) Foreign Application Priority Data
Sep. 24, 2013 (IE) .................................. S2013/0293

(51) Int. Cl.
G01F 19/00 (2006.01)
G01F 25/00 (2006.01)
B67D 7/08 (2010.01)

(52) U.S. Cl.
CPC ............ G01F 19/00 (2013.01); B67D 7/085 (2013.01); G01F 25/0038 (2013.01); G01F 25/0092 (2013.01)

(58) Field of Classification Search
CPC .................................. G01F 19/00; B67D 7/085
(Continued)

(56) References Cited

U.S. PATENT DOCUMENTS 1,277,760 A * 9/1918 Seraphin ................. G01F 19/00
73/323
2,031,230 A 2/1936 Seraphin
(Continued)

FOREIGN PATENT DOCUMENTS

EP 0 472 363 A2 2/1992
EP 2 354 003 A1 8/2011

OTHER PUBLICATIONS

Apljak Ventures / Original Design by Andreas Viklund: "Volumetric Calibrations", Jan. 1, 2010, pp. 1-16, Http://andreasviklund.Com/.
(Continued)

Primary Examiner — Harshad R Patel
Assistant Examiner — Jamel Williams
(74) Attorney, Agent, or Firm — Sughrue Mion, PLLC

(57) ABSTRACT

A measuring vessel (1) for determining the accuracy with which a liquid fuel dispenser dispenses liquid fuel comprises a neck (4) of transparent material. A primary arcuate panel (16) having three primary graduated scales (14) corresponding to three different kinds of liquid fuels is secured to the neck (4). Primary graduations (17) of the respective primary graduated scales (14) indicate the level to which the meniscus of actual volumes of the respective liquid fuel dispensed at the temperatures corresponding to the primary graduations (17) should rise so that the energy content of the actual volumes of the respective liquid fuels dispensed is equal to the energy content of a predefined calibration volume of the corresponding liquid fuel at a predefined reference temperature typically of 15° C. A secondary arcuate panel (20) having a secondary graduated scale (22) thereon is slideable relative to the primary graduated scales (17) so that a reference graduation (23) of the secondary graduated scale (22) can be aligned with an appropriate one of the primary graduations (17) of an appropriate one of the primary graduated scales (14), in order that the amount by which the
(Continued)

Figure 1:
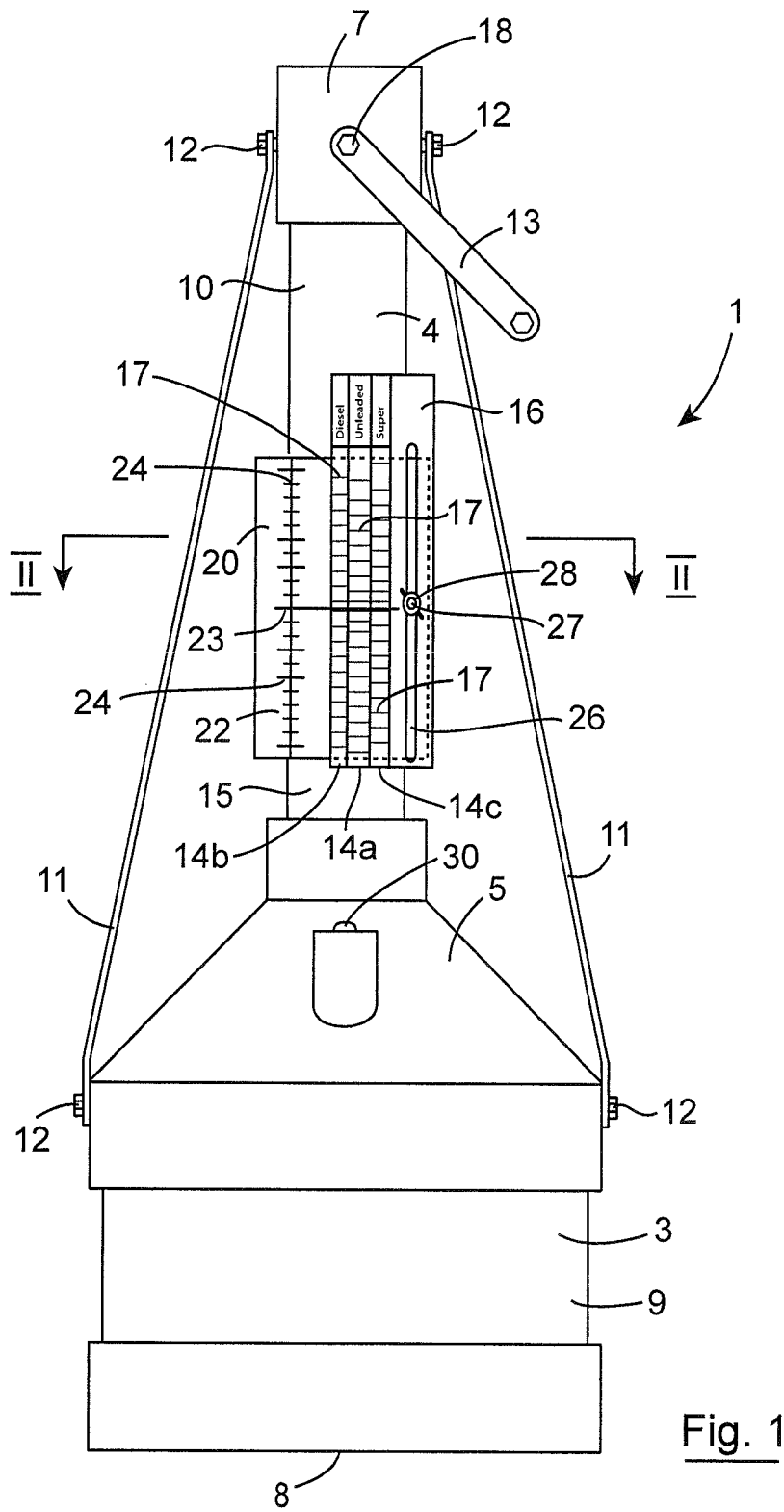

actual volume of liquid fuel dispensed exceeds or falls below the actual volume which should have been dispensed.

19 Claims, 3 Drawing Sheets

(58) Field of Classification Search
USPC .......................................................... 73/427
See application file for complete search history.

(56) References Cited

U.S. PATENT DOCUMENTS

| | | | | |
|---|---|---|---|---|
| 2,872,814 | A * | 2/1959 | Brown | G01F 1/50 235/61 E |
| 2,972,889 | A * | 2/1961 | Offutt | B01L 3/021 422/514 |
| 4,137,940 | A * | 2/1979 | Faisandier | A61M 5/1689 137/486 |
| 5,607,078 | A * | 3/1997 | Nordberg | A47G 23/16 116/227 |
| 7,543,495 | B2 * | 6/2009 | Rubalsky | G01F 19/00 73/427 |

OTHER PUBLICATIONS

International Search Report of PCT/IE2014/000016 dated Jan. 26, 2015 [PCT/ISA/210].
Written Opinion of PCT/IE2014/000016 dated Jan. 26, 2015 [PCT/ISA/237].

* cited by examiner

MEASURING VESSEL

CROSS REFERENCE TO RELATED APPLICATIONS

This application is a National Stage of International Application No. PCT/IE2014/000016, filed Sep. 24, 2014, claiming priority based on Irish Patent Application No. S2013/0293, filed Sep. 24, 2013, the contents of all of which are incorporated herein by reference in their entirety.

The present invention relates to a measuring vessel, and in particular, though not limited to a measuring vessel for use in determining the accuracy with which liquid fuel is dispensed from a liquid fuel dispenser during calibration thereof where limits are defined by statutory metrology. Such liquid fuel dispensers are of the type commonly referred to as petrol pumps of the type which are normally found in the forecourts of service stations. In particular, the invention relates to such a measuring vessel for determining the accuracy with which such a liquid fuel dispenser with automatic temperature compensation dispenses liquid fuel. The invention also relates to a method for determining the accuracy with which liquid fuel is being dispensed by a liquid fuel dispenser.

Dispensers for dispensing liquid fuels, such as petrol, diesel and the like which are located on forecourts of service stations are well known. Broadly speaking, such liquid fuel dispensers can be categorised into two types, firstly, the older type of liquid fuel dispensers which dispense liquid fuel by volume irrespective of the temperature of the fuel, and secondly, the newer type of liquid fuel dispensers which have inbuilt automatic temperature compensation. The automatic temperature compensation in the newer type of liquid fuel dispensers compensates for the variation in the energy content of a predefined volume of the liquid fuel as the temperature of the liquid fuel varies. Therefore, the volume of the liquid fuel dispensed by such liquid fuel dispensers with automatic temperature compensation is automatically adjusted, so that for a given requested volume of the liquid fuel, the energy content of the actual dispensed volume will be constant irrespective of the temperature of the liquid fuel being dispensed, and the energy content of the actual volume of the liquid fuel dispensed will be equal to the energy content that the requested volume would have at a predefined reference temperature, which in general, is 15° C. Put another way, the energy content of the liquid fuel dispensed is proportional to the price paid for an amount of the liquid fuel dispensed, rather than the volume of the amount of the liquid fuel dispensed being proportional to the price paid.

Due to wear and other conditions in such liquid fuel dispensers, be they the older type of dispenser or the newer type which include automatic temperature compensation, such liquid fuel dispensers must be periodically calibrated to limits defined by statutory metrology. Calibration of such liquid fuel dispensers, in general, is carried out by operating the liquid fuel dispenser to dispense a predefined volume of liquid fuel into a measuring vessel, and determining by how much the volume of liquid dispensed by the liquid fuel dispenser either exceeds or falls below the predefined volume which should have been dispensed by the liquid fuel dispenser. Such measuring vessels can be readily easily used in the calibration of the older type of liquid fuel dispensers which do not include automatic temperature compensation.

However, in order to use such measuring vessels in the calibration of the newer type of liquid fuel dispensers with automatic temperature compensation, relatively complex computations must be carried out to take into account the temperature of the liquid fuel being dispensed in order to compute the actual volume of the liquid fuel which should be dispensed so that the energy content of the computed actual volume of the liquid fuel has the same energy content as the energy content which the predefined volume of the liquid fuel would have at the predefined reference temperature. These computations are relatively complex and prone to human error. If an error should occur in the computations, a liquid fuel dispenser with automatic temperature compensation calibrated with a conventional measuring vessel will be incorrectly calibrated. The propensity for errors to arise in the calibration of liquid fuel dispensers with automatic temperature compensation with conventional measuring vessels, leads to uncertainty as to the accuracy with which such liquid fuel dispensers with automatic temperature compensation dispense liquid fuel. This is unsatisfactory.

There is therefore a need for a measuring vessel which addresses this problem.

The present invention is directed towards providing such a measuring vessel, and the invention is also directed towards providing a method for determining the accuracy with which liquid fuel is being dispensed by a liquid fuel dispenser comprising automatic temperature compensation.

According to the invention there is provided a measuring vessel comprising a hollow interior region for receiving a volume of liquid fuel, at least one primary graduated scale provided on the measuring vessel having a plurality of primary graduations indicative of predefined volumes of the measuring vessel which would be occupied by the liquid fuel of a predefined energy content at respective predefined temperature values of the liquid fuel, a secondary graduated scale having a reference graduation selectively alignable with each one of the primary graduations of the primary graduated scale, and a plurality of secondary graduations located to at least one side of the reference graduation, the secondary graduations being indicative of the respective amounts by which the liquid fuel in the measuring vessel has one of (a) exceeded the volume of which the primary graduation, with which the reference graduation is aligned, is indicative, and (b) failed to reach the volume of which the primary graduation, with which the reference graduation is aligned, is indicative, the secondary graduated scale being slideable longitudinally along the primary graduated scale for aligning the reference graduation with a selected one of the primary graduations corresponding to the temperature of the liquid fuel.

Preferably, the secondary graduations of the secondary graduated scale extend on respective opposite sides of the reference graduation.

Advantageously, the graduations of the respective primary and secondary graduated scales correspond to levels of the meniscus of the liquid fuel in the measuring vessel which are indicative of respective volumes of the liquid fuel therein.

In one aspect of the invention at least a portion of the measuring vessel is transparent for viewing the level of the meniscus of the liquid fuel in the measuring vessel. Preferably, the primary graduated scale is located on the measuring vessel adjacent the transparent portion thereof. Advantageously, the primary graduated scale is located adjacent an outer surface of the transparent portion of the measuring vessel.

In another aspect of the invention the secondary graduated scale is located on the measuring vessel adjacent the transparent portion thereof. Preferably, the secondary graduated scale is located adjacent an outer surface of the transparent portion of the measuring vessel. Advantageously, the secondary graduated scale is located adjacent the primary graduated scale.

In another aspect of the invention the secondary graduated scale is located between the measuring vessel and the primary graduated scale. Preferably, the secondary graduated scale extends parallel to the primary graduated scale. Advantageously, the secondary graduated scale is slideable relative to the primary graduated scale in a direction substantially parallel to the primary graduated scale.

In a further aspect of the invention the primary graduated scale extends substantially vertically.

In another aspect of the invention a securing means is provided for releasably securing the secondary graduated scale relative to the primary graduated scale with the reference graduation of the secondary graduated scale aligned with the selected one of the primary graduations of the primary graduated scale. Preferably, the securing means comprises a screw and a nut for securing the secondary graduated scale relative to the primary graduated scale. Advantageously, the screw extends through an elongated slot in one of the primary graduated scale and the secondary graduated scale for permitting relative movement of one of the primary and secondary graduated scales relative to the other one of the primary and secondary graduated scale. Ideally, the nut comprises a wing nut.

Preferably, the primary graduated scale is adjustably mounted on the measuring vessel for facilitating initial calibration of the measuring vessel.

In one aspect of the invention at least two primary graduated scales are provided corresponding to respective different liquid fuels.

In another aspect of the invention three primary graduated scales are provided corresponding to three respective liquid fuels.

Preferably, the primary graduations of one of the primary graduated scales are indicative of volumes of the measuring vessel which would be occupied by unleaded petrol of a predefined energy content at respective predefined temperatures of the unleaded petrol.

Advantageously, the primary graduations of one of the primary graduated scales are indicative of volumes of the measuring vessel which would be occupied by diesel fuel of a predefined energy content at respective predefined temperatures of the diesel fuel.

Preferably, the primary graduations of one of the primary graduated scales are indicative of volumes of the measuring vessel which would be occupied by super-grade petrol of a predefined energy content at respective predefined temperatures of the super-grade petrol.

In another aspect of the invention the measuring vessel comprises a material of a relatively low coefficient of expansion. Preferably, the material of the measuring vessel comprises carbon fibre reinforced epoxy resin. Advantageously, the material of the measuring vessel comprises a material having a coefficient of thermal expansion of the order of $1 \times 10^{-6}$.

In another aspect of the invention the measuring vessel comprises an elongated neck of substantially constant transverse cross-sectional area, and the primary and secondary graduated scales are located adjacent the neck of the measuring vessel.

Preferably, the primary and secondary graduated scales are located on the neck of the measuring vessel.

Advantageously, the neck comprises the transparent portion of the measuring vessel.

In a further aspect of the invention the neck of the measuring vessel extends upwardly from a lower portion of the measuring vessel of transverse cross-sectional area greater than the transverse cross-sectional area of the neck.

The invention also provides a method for determining the accuracy with which liquid fuel is being dispensed by a liquid fuel dispenser comprising automatic temperature compensation, the method comprising providing the measuring vessel as claimed in any preceding claim, determining the temperature of the liquid fuel being dispensed by the liquid fuel dispenser, aligning the reference graduation of the secondary graduated scale with the primary graduation of the primary graduated scale corresponding to the type of liquid fuel, which corresponds to the temperature of the liquid fuel, operating the liquid fuel dispenser to dispense an amount of the liquid fuel corresponding to a predefined volume of the liquid fuel at a predefined reference temperature, collecting the amount of the liquid fuel dispensed by the liquid fuel dispenser in the measuring vessel, and determining the accuracy with which the liquid fuel dispenser dispensed the liquid fuel by determining from the secondary graduated scale the amount by which the volume of the liquid fuel dispensed by the liquid fuel dispenser one of (a) exceeds the predefined volume of which the primary graduation of the corresponding primary graduated scale, with which the reference graduation is aligned, is indicative, and (b) fails to reach the predefined volume of which the primary graduation of the corresponding primary graduated scale, with which the reference graduation is aligned, is indicative.

The advantages of the invention are many. A particularly important advantage of the measuring vessel according to the invention is that by appropriately setting the secondary graduated scale relative to the primary graduated scale such that the type of liquid fuel and its temperature are taken into account, the accuracy with which a liquid fuel dispenser with automatic temperature compensation dispenses liquid fuel can be accurately determined, and thus, such a liquid fuel dispenser with automatic temperature compensation can be accurately calibrated using the measuring vessel according to the invention. Such accurate calibration of a liquid fuel dispenser with automatic temperature compensation can be carried out accurately with the measuring vessel according to the invention without the need to carry out any computations or calculations. All that is required is to appropriately set the secondary graduated scale relative to the primary graduated scale.

Figure 2:
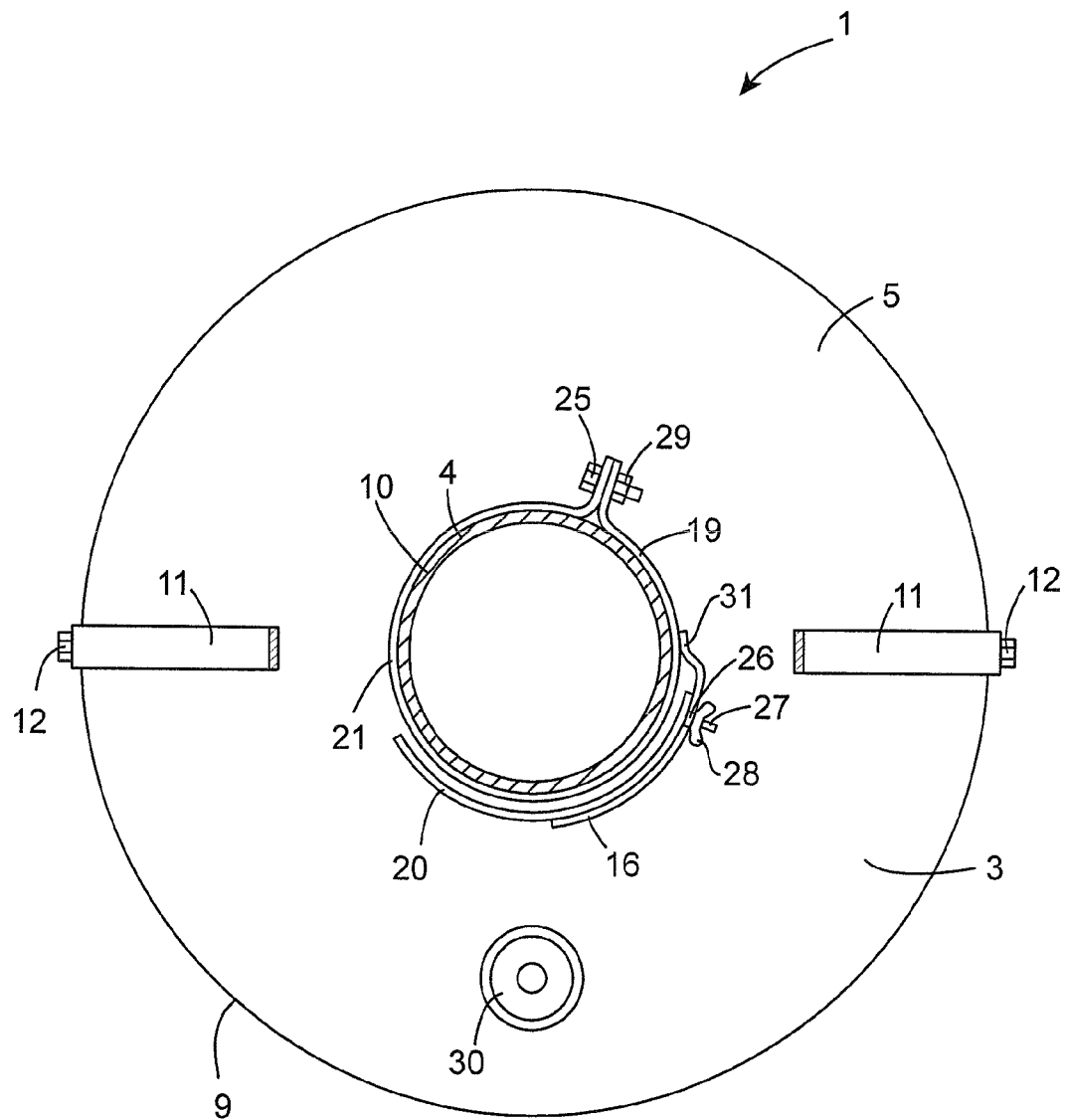
Figure 3:
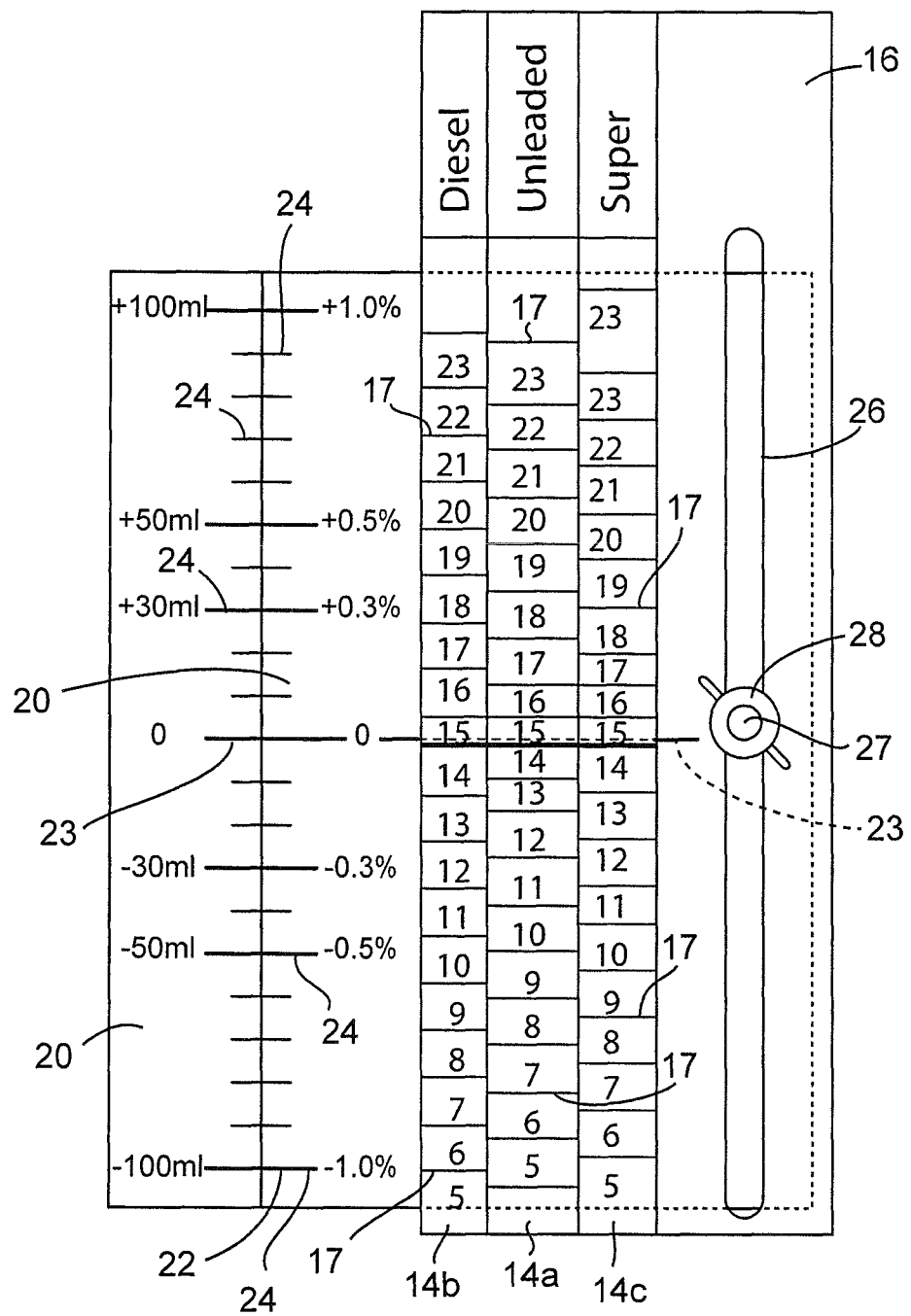

The invention will be more clearly understood from the following description of a preferred embodiment thereof, which is given by way of example only, with reference to the accompanying drawings, in which:

FIG. 1 is a front elevational view of a measuring vessel according to the invention, FIG. 2 is a cross-sectional plan view of the measuring vessel of FIG. 1 on the line II-II of FIG. 1, and FIG. 3 is an enlarged front elevational view of a detail of the measuring vessel of FIG. 1.

Referring to the drawings, there is illustrated a measuring vessel according to the invention, indicated generally by the reference numeral 1, for determining the accuracy with which liquid fuel is dispensed by a liquid fuel dispenser of the type which comprises automatic temperature compensation. In particular, the measuring vessel 1 is particularly suitable for use in the calibration of a liquid fuel dispenser which comprises automatic temperature compensation, such as, for example, a petrol pump for dispensing petrol in the forecourt of a service station, a diesel pump for dispensing diesel in the forecourt of a service station and the like.

The measuring vessel 1 comprises a lower cylindrical portion 3, and an upper cylindrical neck 4, which is of diameter which is significantly less than the diameter of the lower cylindrical portion 3. The neck 4 extends centrally upwardly from an upwardly tapering intermediate portion 5, which joins the neck 4 with the lower cylindrical portion 3. The lower cylindrical portion 3 comprises a base 8 and a lower cylindrical side wall 9 extending around and upwardly from the base 8 to the intermediate portion 5. In this embodiment of the invention the lower cylindrical portion 3 and the intermediate portion 5 of the measuring vessel 1 are of opaque carbon fibre reinforced epoxy resin with a coefficient of expansion of the order of $1 \times 10^{-6}$. The neck 4 comprises an upper cylindrical side wall 10 of transparent glass fibre epoxy composite, which extends upwardly from the intermediate portion 5. A pair of reinforcing struts 11 of stainless steel extend between the lower cylindrical portion 3 and a stainless steel protective collar 7 which extends around the neck 4 adjacent the top thereof. The struts 11 are secured to the lower cylindrical side wall 9 of the lower cylindrical portion 3 and to the collar 7 by screws 12. A handle 13 also of stainless steel for carrying the measuring vessel 1 is secured to the collar 7 by screws 18.

The lower cylindrical portion 3, the neck 4 and the intermediate portion 5 define a hollow interior region for receiving liquid fuel from a liquid fuel dispenser to be calibrated. In this embodiment of the invention the capacity of the measuring vessel 1 including the lower cylindrical portion 3, the neck 4 and the intermediate portion 5 exceeds 10 liters. The capacity of the lower cylindrical portion 3 and the intermediate portion 5 has a combined capacity of less than 10 liters, so that when a nominal 10 liters of the liquid fuel is dispensed into the measuring vessel 1, the level of the liquid fuel dispensed into the measuring vessel 1 rises into the neck 4.

Three vertically extending primary graduated scales 14 are provided on a primary arcuate panel 16, which is secured to the neck 4 and extends partly around and is spaced apart from the upper cylindrical side wall 10 of the neck 4. Each primary graduated scale 14 comprises a plurality of primary graduations 17 which are indicative of volumes of the measuring vessel 1 which would be occupied by three different liquid fuels, namely, unleaded petrol, diesel and super-grade leaded petrol, dispensed by respective liquid fuel dispensers with automatic temperature compensation within a temperature range of 5° C. to 23° C., so that the actual volumes of the respective liquid fuels dispensed at the respective temperatures comprise the same energy content as a predefined calibration volume of the respective liquid fuels when dispensed at a predefined reference temperature. In this embodiment of the invention, the predefined calibration volume is 10 liters, and the predefined reference temperature is 15° C. The temperature values in degrees centigrade of the liquid fuels to which the respective primary graduations 17 of each primary graduated scale correspond are identified adjacent and beneath the respective primary graduations 17 of the primary graduated scale 14.

Of the three primary graduated scales 14, the primary graduated scale 14a comprises primary graduations 17 which are indicative of the actual volumes of the measuring vessel 1 which would be occupied by unleaded petrol at the respective temperatures in the range 5° C. to 23° C. with an energy content equal to the energy content of the predefined calibration volume of unleaded petrol at the predefined reference temperature. The primary graduations 17 of the primary graduated scale 14b are indicative of the actual volumes of the measuring vessel 1 which would be occupied by diesel fuel at the respective temperatures in the range 5° C. to 23° C. with an energy content equal to the energy content of the predefined calibration volume of diesel fuel at the predefined reference temperature. The primary graduations 17 of the primary graduated scale 14c are indicative of the actual volumes of the measuring vessel 1 which would be occupied by super-grade leaded petrol at the respective temperatures in the range 5° C. to 23° C. with an energy content equal to the energy content of the predefined calibration volume of super-grade leaded petrol at the predefined reference temperature.

The primary arcuate panel 16 on which the primary graduated scales 14 are provided comprises transparent glass fibre epoxy composite, which is mounted on and secured to the upper cylindrical side wall 10 of the neck 4 by a clamping mechanism 21. The clamping mechanism 21 comprises a clamping band 19 extending around the upper side wall 10 of the neck 4 and is retained clamped thereto by a pair of screws 25 and nuts 29, only one of each of which is illustrated in FIG. 2. However, the clamping band 19 is releasable, so that the primary arcuate panel 16, and in turn the primary graduated scales 14 are adjustable longitudinally upwardly and downwardly along the neck 4 in order to facilitate initial calibration of the measuring vessel 1. The primary arcuate panel 16 is secured to the clamping band 19 by bonding at 31.

A secondary arcuate panel 20 of a transparent material similar to the material of the primary arcuate panel 16 carries a secondary graduated scale 22, and is located between the side wall 10 of the neck 4 and the primary arcuate panel 16. The secondary graduated scale 22 comprises a reference graduation 23 and a plurality of secondary graduations 24 on respective opposite sides of the reference graduation 23, namely, above and below the reference graduation 23. The secondary arcuate panel 20 is longitudinally slideable along the neck 4 for sliding the secondary graduated scale 22 upwardly and downwardly relative to and parallel to the primary graduated scales 14 for facilitating alignment of the reference graduation 23 with a selected one of the primary graduations 17, which corresponds with the temperature of the liquid fuel being dispensed from the liquid fuel dispenser, of the relevant one of the primary graduated scales 14, which corresponds with the liquid fuel being dispensed.

With the reference graduation 23 of the secondary graduated scale 22 aligned with the appropriate primary graduation 17 of the appropriate primary graduated scale 14, the amount by which the liquid fuel dispensed by the liquid fuel dispenser into the measuring vessel 1 either exceeds the volume or falls below the volume, of which the primary graduation 17 of the relevant primary graduated scale 14, with which the reference graduation 23 of the secondary graduated scale 22 is aligned, is indicative, can be readily determined from the secondary graduated scale 22. In this way, the accuracy with which a liquid fuel dispenser is dispensing liquid fuel can be determined during calibration of the liquid fuel dispenser.

In FIG. 1 for ease of illustration and explanation, the primary arcuate panel 16 and the secondary arcuate panel 20 are deliberately illustrated not in their arcuate configuration, but rather in a planar configuration.

An elongated longitudinally extending guide slot 26 extends vertically along and through the primary arcuate panel 16 and accommodates a releasable securing means, namely, a screw 27 with a wing nut 28 for releasably securing the secondary arcuate panel 20 to the primary arcuate panel 16. The screw 27 extends from the secondary arcuate panel 20 and is slideable in the guide slot 26 for facilitating sliding and guiding of the secondary arcuate panel 20 relative to the primary arcuate panel 16, for in turn sliding and guiding the secondary graduated scale 22 along and parallel with the primary graduated scales 14. The wing nut 28 on the screw 27 releasably secures the secondary arcuate panel 20 to the primary arcuate panel 16 with the reference graduation 23 aligned with the appropriate one of the primary graduations 17 of the appropriate primary graduated scale 14.

A bubble spirit level 30 is located on the intermediate portion 5 of the measuring vessel 1 to facilitate levelling of the measuring vessel 1 when standing on the ground or other surface prior to use.

In use, with the measuring vessel 1 leveled, the measuring vessel 1 is initially calibrated by delivering the predefined calibration volume, in this case 10 liters, of one of the liquid fuels with which one of the primary graduated scales 14 corresponds, with the liquid fuel being at the predefined reference temperature, in this case 15° C. The position of the primary arcuate panel 16 is adjusted vertically along the neck 4 until the primary graduation 17 of the appropriate primary graduated scale 14 corresponding to 15° C. is aligned with the meniscus of the liquid fuel in the neck 4 of the measuring vessel 1. The clamping mechanism 21 is then tightly clamped onto the neck 4 in order to tightly secure the primary arcuate panel 16 to the neck 4. With the primary arcuate panel 16 secured at the calibration position on the neck 4, the measuring vessel 1 is then ready for use.

To determine the accuracy with which a liquid fuel dispenser is dispensing the liquid fuel, the temperature of the liquid fuel being dispensed by the liquid fuel dispenser is first determined. For example, if the liquid fuel dispenser is a petrol pump for dispensing unleaded petrol, the temperature of the unleaded petrol being dispensed by the petrol pump is measured. Assuming the petrol is unleaded petrol, the primary graduated scale 14*a* is the relevant primary graduated scale to be used for determining the accuracy with which the petrol pump is dispensing the unleaded petrol. The secondary graduated scale 22 is adjusted along the primary graduated scale 14*a* until the reference graduation 23 of the secondary graduated scale 22 is aligned with the primary graduation 17 of the primary graduated scale 14*a* which corresponds with the measured temperature of the unleaded petrol being dispensed. The secondary arcuate panel 20 is then secured to the primary arcuate panel 16 by the wing nut 28. The measuring vessel is leveled. The petrol pump is then operated to discharge 10 liters of the unleaded petrol. If the petrol pump is correctly calibrated, the actual volume of the unleaded petrol dispensed into the measuring vessel should be such that the meniscus of the unleaded petrol in the neck 4 of the measuring vessel 1 coincides with the reference graduation 23.

If the meniscus of unleaded petrol in the neck 4 of the measuring vessel 1 does not coincide with the reference graduation 23 of the secondary graduated scale 22, the amount by which the petrol pump has over-dispensed or under-dispensed the unleaded petrol is read from the secondary graduation 24 of the secondary graduated scale 22 with which the meniscus of the unleaded petrol is aligned. If the meniscus of the unleaded petrol dispensed into the measuring vessel 1 is above the reference graduation 23, the petrol pump has over-dispensed, and conversely if the meniscus of unleaded petrol in the measuring vessel 1 is below the level of the reference graduation 23, the petrol pump has under-dispensed. Appropriate adjustments can then be made to the petrol pump until the actual volume of unleaded petrol dispensed by the petrol pump coincides with the reference graduation 23 of the secondary graduated scale 22.

The use of the measuring vessel 1 in the calibration of a petrol pump, which dispenses super-grade leaded petrol, is similar to that described for its use in the calibration of a petrol pump which dispenses unleaded petrol, with the exception that the reference graduation 23 of the secondary graduated scale 22 is aligned with the primary graduation 17 of the primary graduated scale 14*c*, which corresponds to the temperature of the super-grade leaded petrol being dispensed, and so on for a diesel pump, with the exception that the reference graduation 23 of the secondary graduated scale 22 is aligned with the primary graduation 17 of the primary graduated scale 14*b*, which corresponds to the temperature of diesel fuel being dispensed.

While the measuring vessel 1 has been described as comprising carbon fibre reinforced epoxy resin, the measuring vessel may be of any suitable material. It will also be appreciated that while it is desirable, it is not essential that the neck of the measuring vessel should be of a transparent material. However, if the neck of the measuring vessel is not of a transparent material, a portion of the neck of the measuring vessel should be of a transparent material so that the level of the meniscus of the liquid fuel in the measuring vessel is visible through the neck.

While the securing means for securing the secondary arcuate panel relative to the primary arcuate panel has been described as comprising a screw and a wing nut, any other suitable securing means could be used. Needless to say, any other arrangement for sliding the secondary arcuate panel relative to the primary arcuate panel for in turn sliding the secondary graduated scale relative to the primary graduated scale may be provided. It will also be appreciated that any other suitable mounting and securing means for mounting and securing the primary arcuate panel to the neck of the measuring vessel, other than that described may be provided.

While three primary graduated scales have been provided on the measuring vessel, any desired number of primary graduated scales may be provided from one upwards.

While the measuring vessel has been described as being of capacity of just greater than 10 liters, it will be readily apparent to those skilled in the art that the volume of the measuring vessel may be any suitable or desired capacity, and in general, it is envisaged that the measuring vessel may range in capacity from 2 liters to 100 liters, and typically, may be provided in nominal capacities of 2 liters, 5 liters, 10 liters, 20 liters, 30 liters, 50 liters and 100 liters, and in each case the actual capacity would be slightly greater than the nominal capacity.

While the measuring vessel has been described as being suitable for use with unleaded petrol, super-grade petrol and diesel fuel, it will be readily apparent to those skilled in the art that the measuring vessel may be used for calibrating a pump which delivers any type of liquid fuel, and in particular, a range of liquid fuels with different temperature coefficients of expansion.

The invention claimed is:

1. A measuring vessel comprising a hollow interior region for receiving a volume of liquid fuel, at least one primary graduated scale provided on the measuring vessel having a plurality of primary graduations indicative of predefined volumes of the measuring vessel which would be occupied by the liquid fuel of a predefined energy content at respective predefined temperature values of the liquid fuel, a secondary graduated scale having a reference graduation selectively alignable with each one of the primary graduations of the primary graduated scale, and a plurality of secondary graduations located to at least one side of the reference graduation, the secondary graduations being indicative of the respective amounts by which the liquid fuel in the measuring vessel has one of
  (a) exceeded the volume of which the primary graduation, with which the reference graduation is aligned, is indicative, and
  (b) failed to reach the volume of which the primary graduation, with which the reference graduation is aligned, is indicative,
the secondary graduated scale being slideable longitudinally along the primary graduated scale for aligning the reference graduation with a selected one of the primary graduations corresponding to the temperature of the liquid fuel.

2. A measuring vessel as claimed in claim 1 in which the secondary graduations of the secondary graduated scale extend on respective opposite sides of the reference graduation.

3. A measuring vessel as claimed in claim 1 in which the graduations of the respective primary and secondary graduated scales correspond to levels of the meniscus of the liquid fuel in the measuring vessel which are indicative of respective volumes of the liquid fuel therein.

4. A measuring vessel as claimed in claim 1 in which at least a portion of the measuring vessel is transparent for viewing the level of the meniscus of the liquid fuel in the measuring vessel.

5. A measuring vessel as claimed in claim 4 in which the primary graduated scale is located on the measuring vessel adjacent the transparent portion thereof, and preferably, the primary graduated scale is located adjacent an outer surface of the transparent portion of the measuring vessel.

6. A measuring vessel as claimed in claim 4 in which the secondary graduated scale is located on the measuring vessel adjacent the transparent portion thereof, and preferably, the secondary graduated scale is located adjacent an outer surface of the transparent portion of the measuring vessel.

7. A measuring vessel as claimed in claim 1 in which the secondary graduated scale is located adjacent the primary graduated scale, and preferably, the secondary graduated scale is located between the measuring vessel and the primary graduated scale.

8. A measuring vessel as claimed in claim 1 in which the secondary graduated scale extends parallel to the primary graduated scale.

9. A measuring vessel as claimed in claim 1 in which the secondary graduated scale is slideable relative to the primary graduated scale in a direction substantially parallel to the primary graduated scale, and preferably, the primary graduated scale extends substantially vertically.

10. A measuring vessel as claimed in claim 1 in which a securing means is provided for releasably securing the secondary graduated scale relative to the primary graduated scale with the reference graduation of the secondary graduated scale aligned with the selected one of the primary graduations of the primary graduated scale.

11. A measuring vessel as claimed in claim 10 in which the securing means comprises a screw and a nut for securing the secondary graduated scale relative to the primary graduated scale, and preferably, the screw extends through an elongated slot in one of the primary graduated scale and the secondary graduated scale for permitting relative movement of one of the primary and secondary graduated scales relative to the other one of the primary and secondary graduated scale, and advantageously, the nut comprises a wing nut.

12. A measuring vessel as claimed in claim 1 in which the primary graduated scale is adjustably mounted on the measuring vessel for facilitating initial calibration of the measuring vessel.

13. A measuring vessel as claimed in claim 1 in which at least two primary graduated scales are provided corresponding to respective different liquid fuels, and preferably, three primary graduated scales are provided corresponding to three respective liquid fuels.

14. A measuring vessel as claimed in claim 13 in which the primary graduations of one of the primary graduated scales are indicative of volumes of the measuring vessel which would be occupied by unleaded petrol of a predefined energy content at respective predefined temperatures of the unleaded petrol.

15. A measuring vessel as claimed in claim 13 in which the primary graduations of one of the primary graduated scales are indicative of volumes of the measuring vessel which would be occupied by diesel fuel of a predefined energy content at respective predefined temperatures of the diesel fuel.

16. A measuring vessel as claimed in claim 13 in which the primary graduations of one of the primary graduated scales are indicative of volumes of the measuring vessel which would be occupied by super-grade petrol of a predefined energy content at respective predefined temperatures of the super-grade petrol.

17. A measuring vessel as claimed in claim 1 in which the material of the measuring vessel comprises a material having a coefficient of thermal expansion of the order of $1 \times 10^{-6}$.

18. A measuring vessel as claimed in claim 1 in which the measuring vessel comprises an elongated neck of substantially constant transverse cross-sectional area, and the primary and secondary graduated scales are located adjacent the neck of the measuring vessel, and preferably, the primary and secondary graduated scales are located on the neck of the measuring vessel, and advantageously, the neck comprises the transparent portion of the measuring vessel, and preferably, the neck of the measuring vessel extends upwardly from a lower portion of the measuring vessel of transverse cross-sectional area greater than the transverse cross-sectional area of the neck.

19. A method for determining the accuracy with which liquid fuel is being dispensed by a liquid fuel dispenser comprising automatic temperature compensation, the method comprising providing the measuring vessel as claimed in any preceding claim, determining the temperature of the liquid fuel being dispensed by the liquid fuel dispenser, aligning the reference graduation of the secondary graduated scale with the primary graduation of the primary graduated scale corresponding to the type of liquid fuel, which corresponds to the temperature of the liquid fuel, operating the liquid fuel dispenser to dispense an amount of the liquid fuel corresponding to a predefined volume of the liquid fuel at a predefined reference temperature, collecting the amount of the liquid fuel dispensed by the liquid fuel dispenser in the measuring vessel, and determining the accuracy with which the liquid fuel dispenser dispensed the liquid fuel by determining from the secondary graduated scale the amount by which the volume of the liquid fuel dispensed by the liquid fuel dispenser one of (c) exceeds the predefined volume of which the primary graduation of the corresponding primary graduated scale, with which the reference graduation is aligned, is indicative, and
(d) fails to reach the predefined volume of which the primary graduation of the corresponding primary graduated scale, with which the reference graduation is aligned, is indicative.

\* \* \* \* \*